United States Patent
Sidnal et al.

(10) Patent No.: US 8,392,654 B2
(45) Date of Patent: Mar. 5, 2013

(54) RAID LEVEL MIGRATION FOR SPANNED ARRAYS

(75) Inventors: Priyadarshini Mallikarjun Sidnal, Karnataka (IN); Gururaj Shivashankar Morabad, Karnataka (IN)

(73) Assignee: LSI Corporation, Milpitas, CA (US)

( * ) Notice: Subject to any disclaimer, the term of this patent is extended or adjusted under 35 U.S.C. 154(b) by 578 days.

(21) Appl. No.: 12/425,386

(22) Filed: Apr. 17, 2009

(65) Prior Publication Data

US 2010/0268875 A1   Oct. 21, 2010

(51) Int. Cl.
*G06F 12/02* (2006.01)
(52) U.S. Cl. .................................. 711/114; 711/162
(58) Field of Classification Search ............... 714/6.22, 714/6.23, 6.24; 711/114, 162
See application file for complete search history.

(56) References Cited

U.S. PATENT DOCUMENTS

| | | | |
|---|---|---|---|
| 5,666,512 A * | 9/1997 | Nelson et al. | 711/114 |
| 6,834,326 B1 * | 12/2004 | Wang et al. | 711/114 |
| 6,990,667 B2 * | 1/2006 | Ulrich et al. | 718/105 |
| 7,219,289 B2 * | 5/2007 | Dickson | 714/752 |
| 7,441,096 B2 * | 10/2008 | Kitamura | 711/203 |
| 2002/0069318 A1 * | 6/2002 | Chow et al. | 711/104 |
| 2004/0088483 A1 * | 5/2004 | Chatterjee et al. | 711/114 |
| 2005/0138286 A1 * | 6/2005 | Franklin et al. | 711/114 |
| 2007/0143541 A1 * | 6/2007 | Nichols et al. | 711/114 |
| 2008/0195808 A1 * | 8/2008 | Chi | 711/114 |
| 2008/0259710 A1 * | 10/2008 | Wenzel et al. | 365/226 |
| 2009/0037656 A1 * | 2/2009 | Suetsugu et al. | 711/114 |

* cited by examiner

*Primary Examiner* — Son Dinh
(74) *Attorney, Agent, or Firm* — Prakash Nama; Global IP Services, PLLC (57) ABSTRACT

A method for a redundant array of independent disks (RAID) controller for migrating a RAID level in spanned arrays is disclosed. In one embodiment, a method for a RAID controller for migrating a RAID level in spanned arrays includes receiving a command for a RAID level migration from a first RAID level in spanned arrays to a second RAID level. The method further includes initializing a number of pointers which correspond to a number of the spanned arrays in the first RAID level, and transferring at least one data block of the first RAID level in the spanned arrays using the number of pointers to form the second RAID level.

19 Claims, 6 Drawing Sheets

RAID LEVEL MIGRATION FOR SPANNED ARRAYS

FIELD OF TECHNOLOGY

Embodiments of the present invention relate to the field of electronics. More particularly, embodiments of the present invention relate to storage systems, devices, and methods.

BACKGROUND

A redundant array of independent disks (RAID) technology is a data storage scheme that divides and replicates data among multiple hard disk drives. The RAID technology increases data reliability and input/output (I/O) performance by using techniques such as mirroring, the copying of data to more than one disk; striping, the splitting of data across more than one disk; and error correction, where redundant data is stored to allow errors to be detected and possibly fixed. Different RAID levels use one or more of the techniques, depending on their respective system requirements.

Although redundancy based on the mirroring, striping and/or error correction may improve the data reliability, it allows less data to be stored. For instance, a two disk RAID level 1 array may lose half of the total capacity that would have otherwise been available using both disks independently, and a RAID level 5 array with several disks may lose the capacity of one disk for the error correction.

SUMMARY

This summary is provided to comply with 37 C.F.R. §1.73, requiring a summary of the invention briefly indicating the nature and substance of the invention. It is submitted with the understanding that it will not be used to interpret or limit the scope or meaning of the claims.

A method for Redundant Array of Independent Disks (RAID) level migration in spanned arrays is disclosed. In one aspect, a method for a RAID controller for migrating a RAID level in spanned arrays includes receiving a command for a RAID level migration from a first RAID level in spanned arrays to a second RAID level. The method further includes initializing a number of pointers which correspond to a number of the spanned arrays in the first RAID level, and transferring at least one data block of the first RAID level in the spanned arrays using the number of pointers to form the second RAID level.

In another aspect, a method for a RAID controller for migrating from a RAID level 10 to a RAID level 00 includes receiving a command for a RAID level migration from a RAID level 10 to a RAID level 00, initializing a number of pointers which correspond to a number of RAID level 1 arrays in the RAID level 10, and transferring respective data blocks of the RAID level 10 using the number of pointers to form the RAID level 00.

In yet another aspect, a method for a RAID controller for migrating from a RAID level 50 to a RAID level 00 includes receiving a command for a RAID level migration from a RAID level 50 to a RAID level 00, initializing a number of pointers which correspond to a number of RAID level 5 arrays in the RAID level 50, and transferring respective data blocks of the RAID level 50 using the number of pointers to form the RAID level 00.

Other features of the present embodiments will be apparent from the accompanying drawings and from the detailed description that follows.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A method for a redundant array of independent disks (RAID) level migration in spanned arrays is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
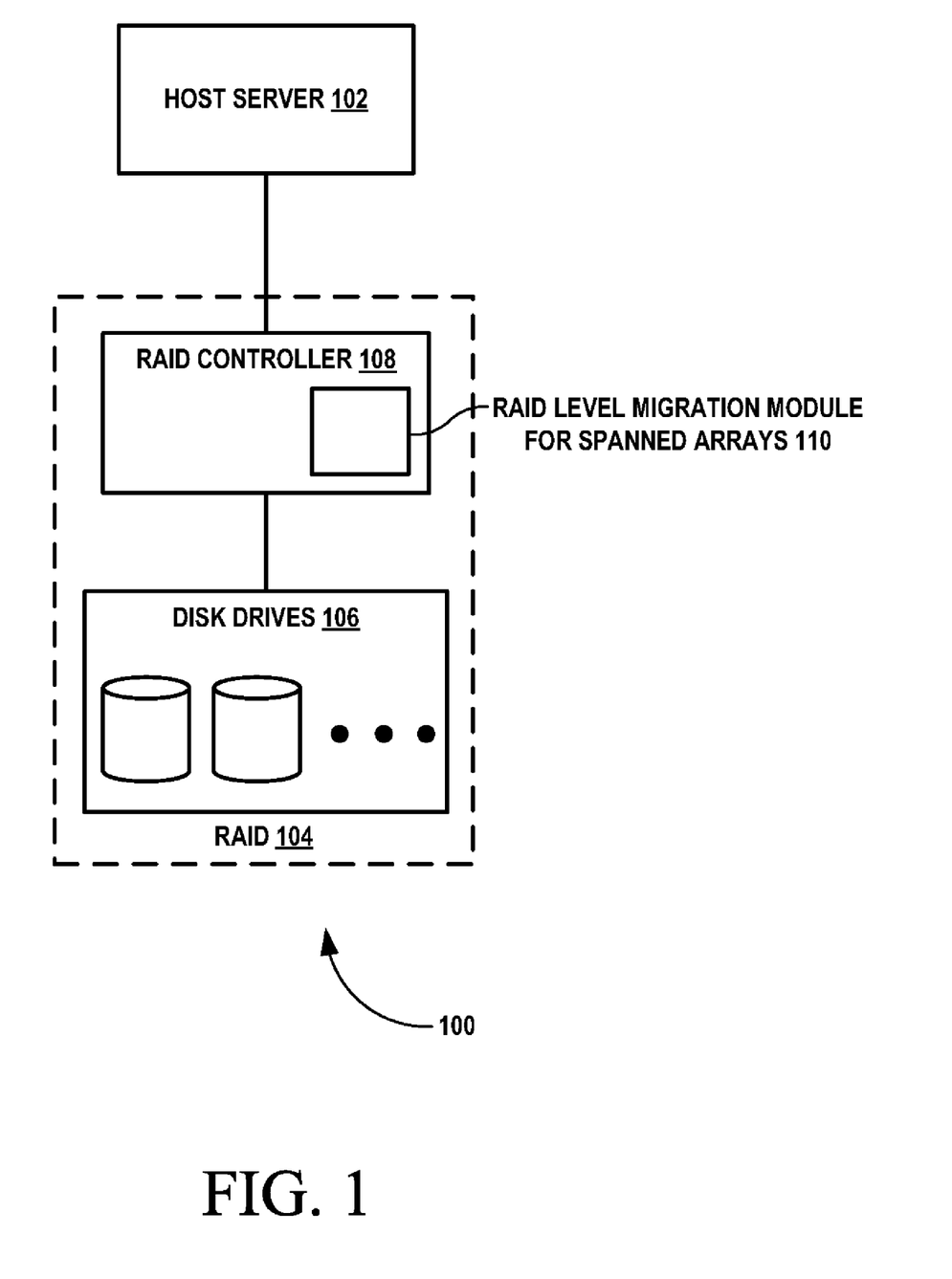
FIG. 1 illustrates a block diagram of an exemplary direct-attached storage (DAS) system with a RAID level migration module for spanned arrays, according to one embodiment.

FIG. 1 illustrates a block diagram of an exemplary direct-attached storage (DAS) system 100 with a RAID level migration module for spanned arrays 110, according to one embodiment. In the DAS system 100, a RAID 104 is directly attached to a host server 102 for receiving input/output requests. The RAID 104 includes disk drives 106 (logically connected to form spanned arrays) and a RAID controller 108 for migrating a RAID level in the spanned arrays. As illustrated, the RAID controller 108 includes the RAID level migration module for spanned arrays 110. In one embodiment, the RAID level migration module for spanned arrays 110 enables the migration of the RAID level in the spanned arrays which is described in greater detail in the following description.

Figure 2A:
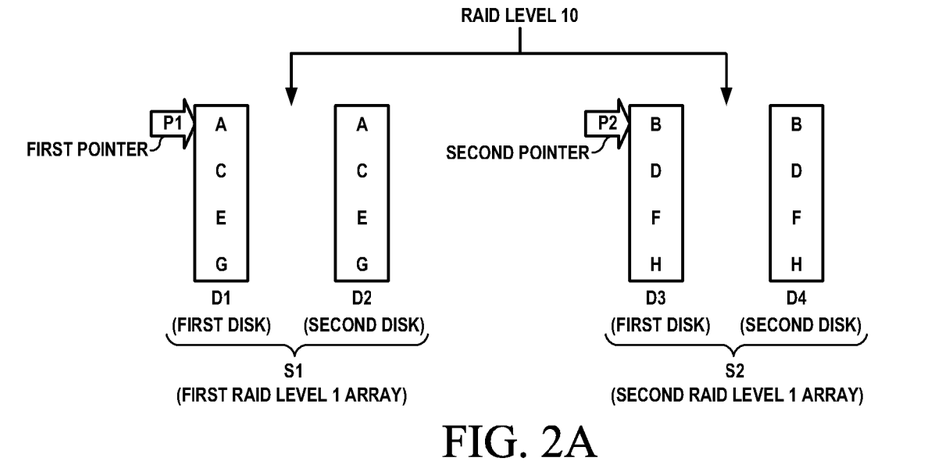
FIGS. 2A through 2F illustrate an exemplary method for a RAID level migration from a RAID level 10 to a RAID level 00, according to one embodiment.

FIGS. 2A through 2F illustrate an exemplary method for a RAID level migration from a RAID level 10 to a RAID level 00, according to one embodiment. Particularly, FIG. 2A illustrates the RAID level 10 with a first RAID level 1 array S1 and a second RAID level 1 array S2. The first RAID level 1 array S1 includes a first disk D1 and a second disk D2. The second RAID level 1 array S2 includes a first disk D3 and a second disk D4.

In operation, when a command for a RAID level migration from the RAID level 10 to the RAID level 00 is received, a first pointer P1 and a second pointer P2 are initialized. The first pointer P1 and the second pointer P2 are associated with the first RAID level 1 array S1 and the second RAID level 1 array S2 respectively, and are stored in a nonvolatile random access memory (NVRAM) of a RAID controller (e.g., the RAID controller 108 of FIG. 1). For example, initializing the first pointer P1 and the second pointer P2 includes, placing the first pointer P1 to a first data block of the first disk D1 of the first RAID level 1 array S1 and the second pointer P2 to a first data block of a first disk D3 of the second RAID level 1 array S2, as illustrated in FIG. 2A. Further, each of the first data blocks of the first disk D1 and the first disk D3 are concurrently read and no change is made to each of the first data blocks.

Figure 2B:
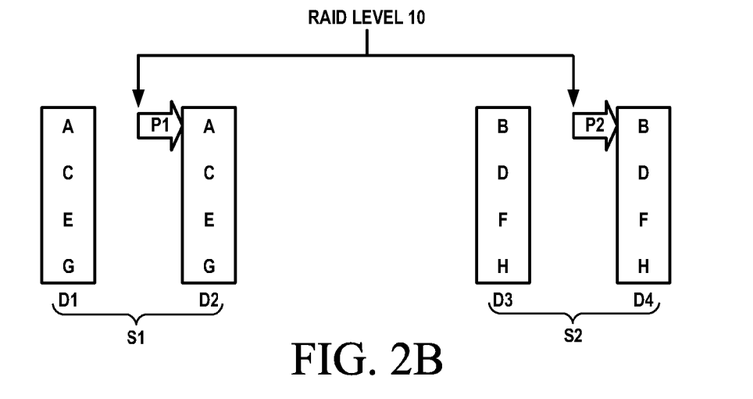

Subsequently, the first pointer P1 and the second pointer P2 are incremented and placed to a first data block of the second disk D2 of the first RAID level 1 array S1 and to a first data block of the second disk D4 of the second RAID level 1 array S2 respectively, as illustrated in FIG. 2B. Further, each of the first data blocks of the second disk D2 and the second disk D4 are concurrently read and stored in a cache memory of the RAID controller.

Figure 2C:
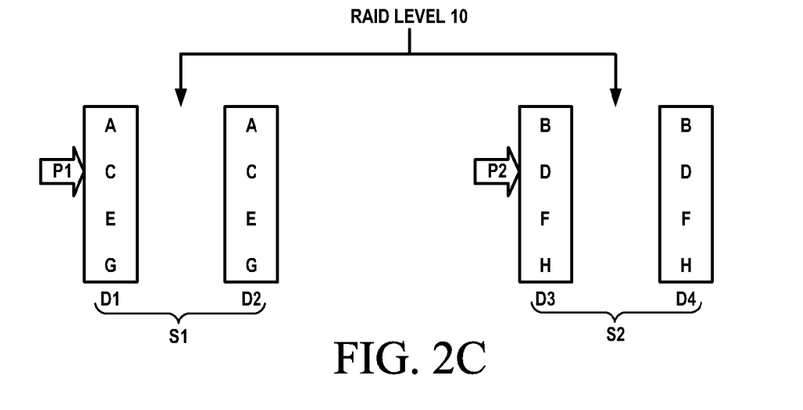

Furthermore, as illustrated in FIG. 2C, the first pointer P1 and the second pointer P2 are placed to a second data block of the first disk D1 of the first RAID level 1 array S1 and to a second data block of the first disk D3 of the second RAID level 1 array S2 respectively, by incrementing the first pointer P1 and the second pointer P2. Each of the second data blocks of the first disk D1 and the first disk D3 are concurrently read and stored in the cache memory of the RAID controller.

Figure 2D:
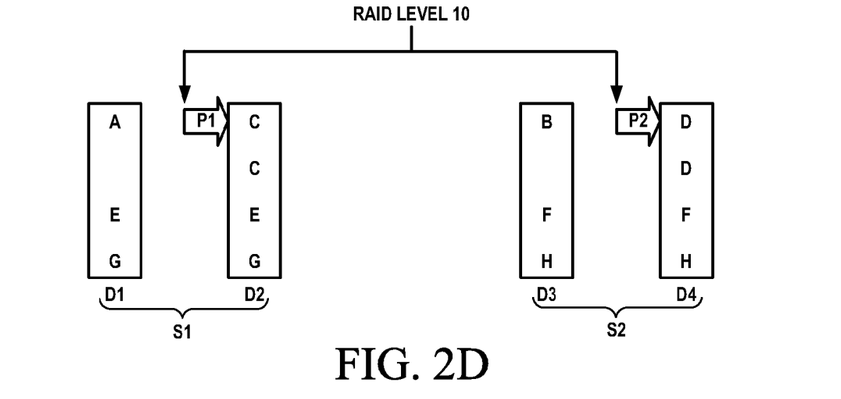

Then, the first data block of the second disk D2 is overwritten with the second data block of the first disk D1 in the first RAID level 1 array S1, as illustrated in FIG. 2D. Similarly, as illustrated in FIG. 2D, the first data block of the second disk D4 is overwritten with the second data block of the first disk D3 in the second RAID level 1 array S2. On completion of the overwriting to respective data blocks (e.g., each of the first data blocks of the second disk D2 and the second disk D4), respective acknowledgement signals are forwarded to the RAID controller. Further, each of the second data blocks of the first disk D1 and the first disk D3 are erased from the cache memory of the RAID controller once the overwriting is completed. It should be noted that, the erasing operation can be performed using any of the erasing techniques well known in the art.

Figure 2E:
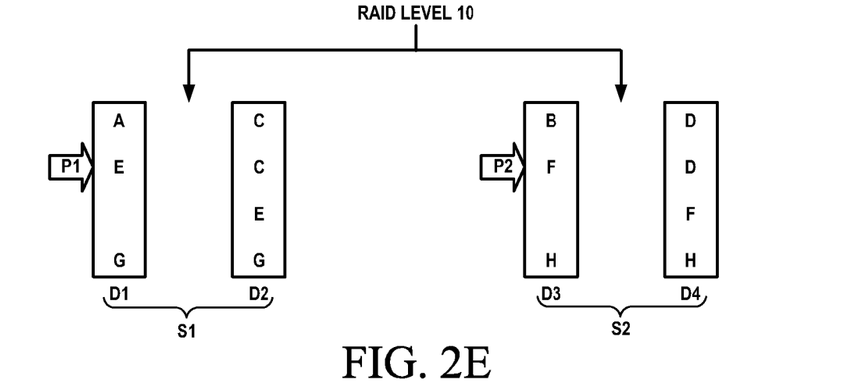

Further, the first pointer P1 and the second pointer P2 are incremented and subsequently placed on remaining data blocks on all the disks of the first RAID level 1 array S1 and the second RAID level 1 array S2, respectively. Furthermore, subsequent data blocks are read and overwritten on previous data blocks in each of the first RAID level 1 array S1 and the first RAID level 1 array S2. As illustrated in FIG. 2E, the first pointer P1 and the second pointer P2 are placed on the second data block of the first disk D1 of the first RAID level 1 array S1 and the second data block of the first disk D3 of the second RAID level 1 array S2 respectively. Then, the second data block of the first disk D1 is overwritten with a third data block of the first disk D1.

Figure 2F:
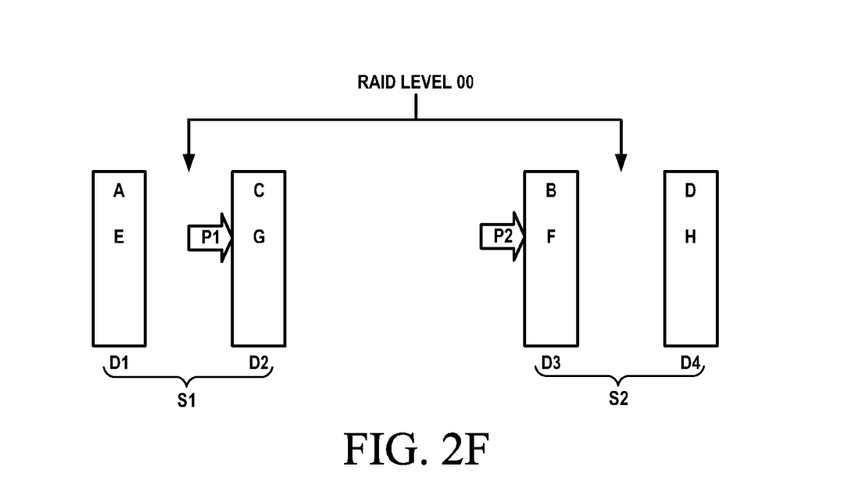

Similarly, the second data block of the first disk D3 is overwritten with a third data block of the first disk D3. Thus, the RAID level migration of spanned arrays is achieved by transferring respective data blocks of the RAID level 10 using the first pointer P1 and the second pointer P2 to form the RAID level 00 as illustrated in FIG. 2F. As a result, a storage space is created each time data from a subsequent data block is read and overwritten on a previous data block in the spanned arrays and hence more data can be stored. Also, by migrating from the RAID level 10 to the RAID level 00, performance (e.g., read performance) of the spanned arrays is increased.

Figure 3A:
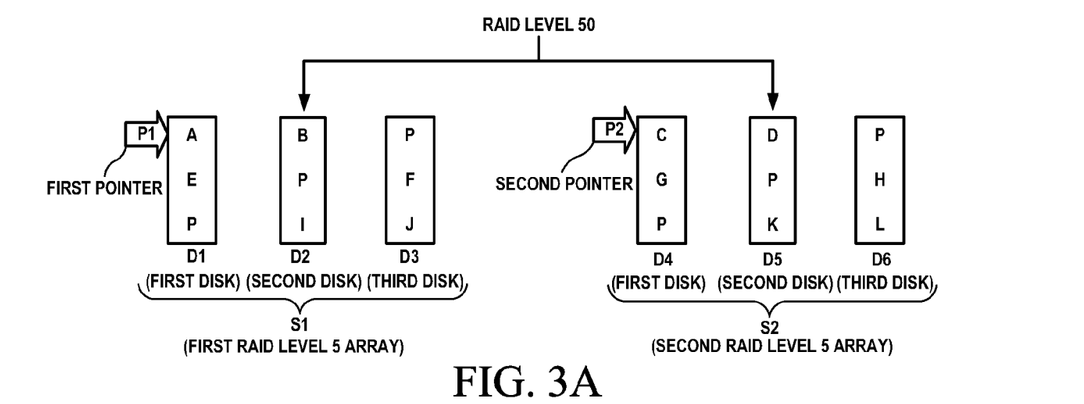
FIGS. 3A through 3H illustrate an exemplary method for a RAID level migration from a RAID level 50 to a RAID level 00, according to one embodiment.

FIGS. 3A through 3H illustrate an exemplary method for a RAID level migration from a RAID level 50 to a RAID level 00, according to one embodiment. Particularly, FIG. 3A illustrates the RAID level 50 with a first RAID level 5 array S1 and a second RAID level 5 array S2. The first RAID level 5 array S1 includes a first disk D1, a second disk D2 and a third disk D3. The second RAID level 5 array S2 includes a first disk D4, a second disk D5 and a third disk D6.

In operation, when a command for a RAID level migration of spanned array from the RAID level 50 to the RAID level 00 is received, a first pointer P1 and a second pointer P2 are initialized. The first pointer P1 and the second pointer P2 are associated with the first RAID level 5 array S1 and the second RAID level 5 array S2 respectively, and are stored in an NVRAM of a RAID controller (e.g., the RAID controller 108 of FIG. 1). For example, initializing the first pointer P1 and the second pointer P2 includes, placing the first pointer P1 to a first data block of the first disk D1 of the first RAID level 5 array S1 and the second pointer P2 to a first data block of a first disk D4 of the second RAID level 5 array S2 respectively, as illustrated in FIG. 3A. Further, each of the first data blocks of the first disk D1 and the first disk D4 are concurrently read and no change is made to each of the first data blocks.

Figure 3B:
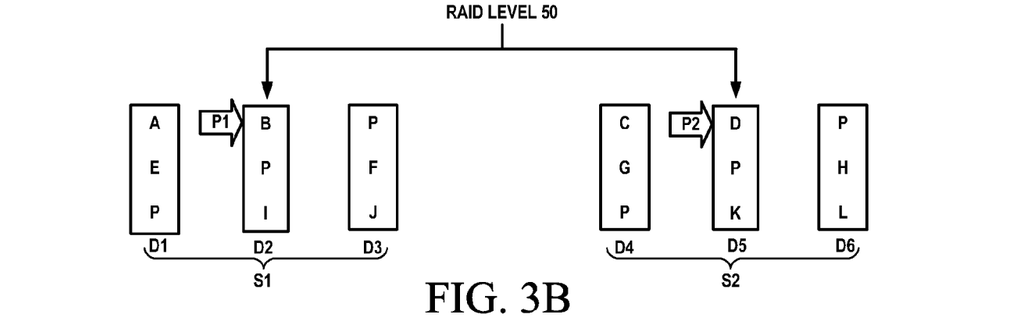

Subsequently, the first pointer P1 and the second pointer P2 are incremented and placed to a first data block of the second disk D2 of the first RAID level 5 array S1 and to a first data block of the second disk D5 of the second RAID level 5 array S2 respectively, as illustrated in FIG. 3B. Further, each of the first data blocks of the second disk D2 and the second disk D5 are concurrently read and stored in a cache memory of the RAID controller.

Figure 3C:
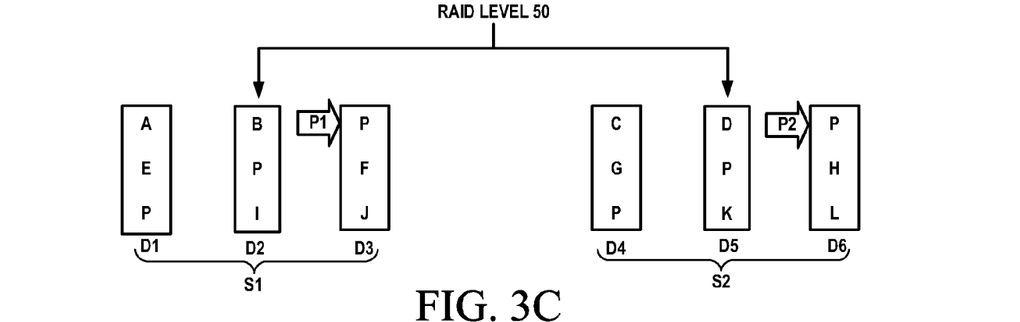

Further, the first pointer P1 and the second pointer P2 are incremented and placed to a first data block of the third disk D3 of the first RAID level 5 array S1 and to a first data block of the third disk D6 of the second RAID level 5 array S2 respectively, as illustrated in FIG. 3C. Further, each of the first data blocks of the third disk D3 and the third disk D6 are concurrently read and stored in the cache memory of the RAID controller.

Figure 3D:
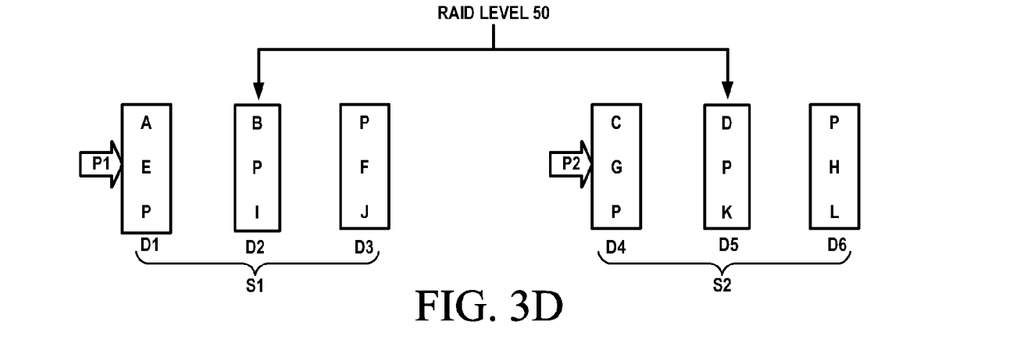

FIG. 3D illustrates placement of the first pointer P1 and the second pointer P2 to a second data block of the first disk D1 of the first RAID level 5 array S1 and a second data block of the first disk D4 of the second RAID level 5 array S2 respectively, by incrementing the first pointer P1 and the second pointer P2. Further, each of the second data blocks of the first disk D1 and the first disk D4 are concurrently read and stored in the cache memory of the RAID controller.

Figure 3E:
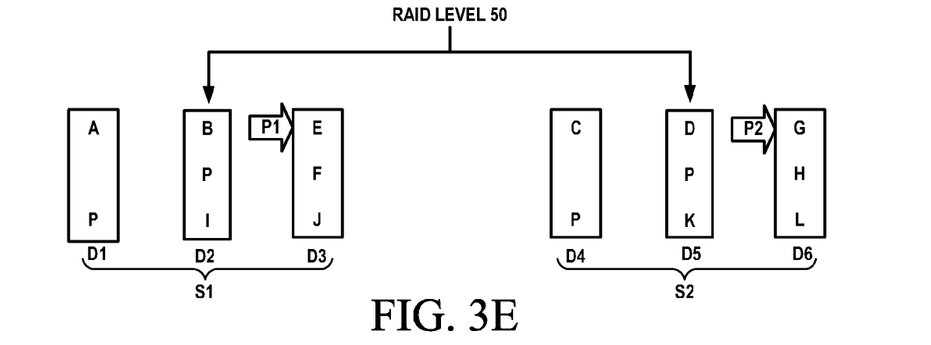

Further, as illustrated in FIG. 3E, the first data block of the third disk D3 is overwritten with the second data block of the first disk D1 in the first RAID level 5 array S1. Similarly, the first data block of the third disk D6 is overwritten with the second data block of the first disk D4 in the second RAID level 5 array S2.

On completion of the overwriting to respective data blocks (e.g., each of the first data blocks of the third disk D3 and the third disk D6), respective acknowledgement signals are forwarded to the RAID controller. Also, each of the second data block of the first disk D1 and the first disk D4 are erased from the cache memory of the RAID controller once the overwriting is completed. It should be noted that, the erasing operation can be performed using any of the erasing techniques well known in the art.

Figure 3F:
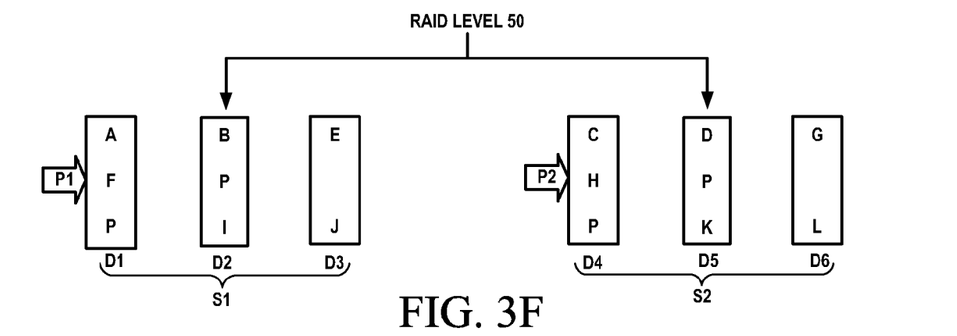
Figure 3G:
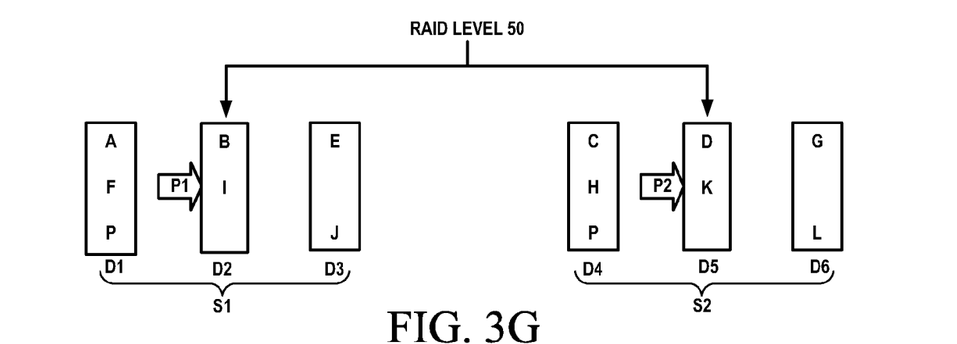
Figure 3H:
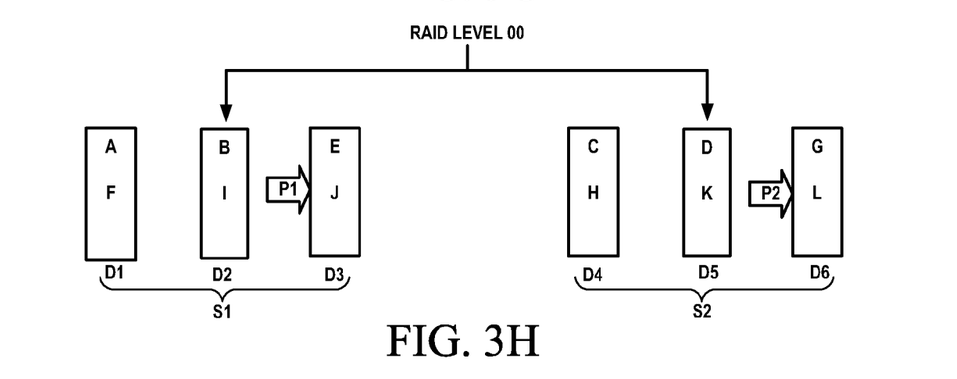

Further, as shown in FIGS. 3F through 3H, the first pointer P1 is incremented and subsequently placed on remaining data blocks on the first disk D1, the second disk D2 and the third disk D3 of the first RAID level 5 array S1. Concurrently, the second pointer P2 is incremented and subsequently placed on remaining data blocks on the first disk D4, the second disk D5 and the third disk D6 of the second RAID level 5 array S2. Furthermore, subsequent data blocks are read and overwritten on previous data blocks in each of the first RAID level 5 array S1 and the first RAID level 5 array S2.

In FIG. 3F, the second data block of the first disk D1 is overwritten with the second data block of the third disk D3 in the first RAID level 5 array S1. Similarly, as shown in FIG. 3F, the second data block of the first disk D4 is overwritten with the second data block of the third disk D6 in the second RAID level 5 array S2. Further, as illustrated in FIG. 3G, the second data block of the second disk D2 is overwritten with a third data block of the second disk D2 in the first RAID level 5 array S1. Similarly, the second data block of the second disk D5 is overwritten with a third data block of the second disk D5 in the second RAID level 5 array S2.

Thus, the RAID level migration of spanned arrays is achieved by transferring respective data blocks of the RAID level 50 using the first pointer P1 and the second pointer P2 to form the RAID level 00 as illustrated in FIG. 3H. As a result, a storage space is created each time data from a subsequent data block is read and overwritten on a previous data block in the spanned arrays and hence more data can be stored. Also, by migrating from the RAID level 50 to the RAID level 00, performance (e.g., read performance) of the spanned arrays is increased.

Figure 4:
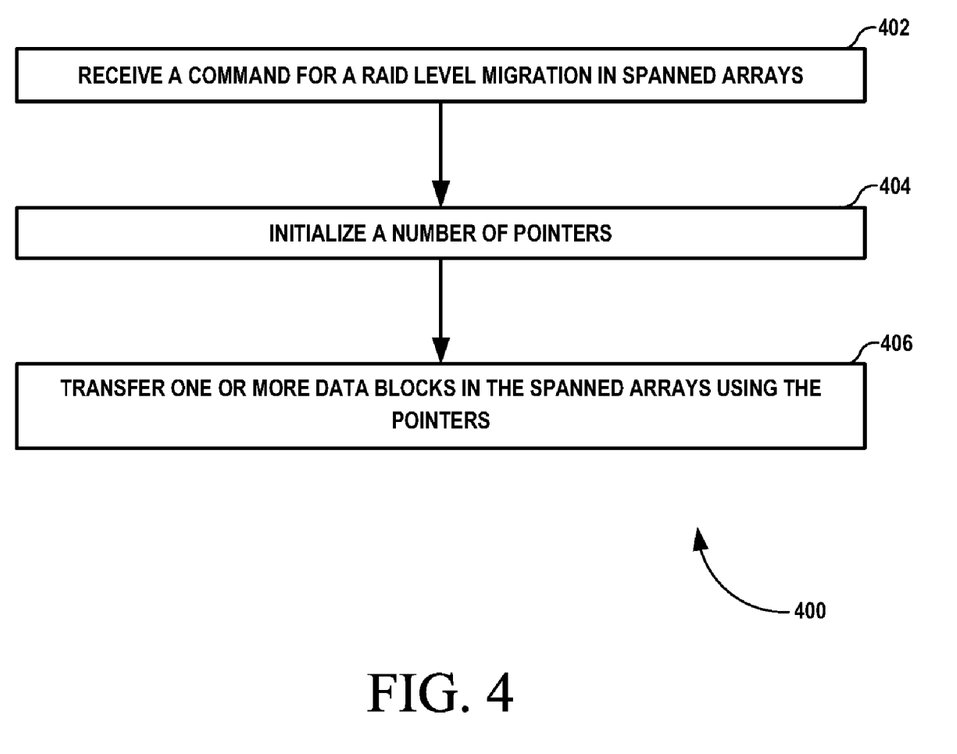
FIG. 4 illustrates a process flow chart of an exemplary method for migrating from a first RAID level with multiple spanned arrays to a second RAID level, according to one embodiment.

FIG. 4 illustrates a process flow chart of an exemplary method 400 for migrating from a first RAID level with multiple spanned arrays to a second RAID level, according to one embodiment. In step 402, a command for a RAID level migration from a first RAID level in spanned arrays to a second RAID level is received. The spanned arrays are directly attached to a host server for receiving input/output requests.

In step 404, a number of pointers which correspond to a number of the spanned arrays in the first RAID level are initialized. The initializing the number of pointers includes placing the number of pointers to first data blocks of each of the spanned arrays in the first RAID level. In one embodiment, the number of pointers are stored in a NVRAM of a RAID controller (a RAID controller with a battery backup unit). Further, copies of the number of pointers are stored in a reserved sector of a main memory of the host server.

In step 406, one or more data blocks of the first RAID level in the spanned arrays are transferred using the number of pointers to form the second RAID level. In one embodiment, transferring the one or more data blocks includes reading the one or more data blocks for each of the spanned arrays using the number of pointers, storing the one or more data blocks from the spanned arrays to a cache memory of the RAID controller, and overwriting each of the one or more data blocks to a respective target data block in the spanned arrays to form the second RAID level.

In one example embodiment, the first RAID level includes a RAID level 10 and the second RAID level includes a RAID level 00. In another example embodiment, the first RAID level includes a RAID level 50 and the second RAID level includes a RAID level 00. In yet another example embodiment, the first RAID level includes a RAID level 60 and the second RAID level includes a RAID level 50 or a RAID level 00.

The above-described method of RAID level migration helps create more storage space and enhance performance in storage systems. The migration is easy to implement and cost effective and does not require additional disks or removal of any disks to create the storage space. Also, the above-described method ensures redundancy in the spanned arrays when migrating from a RAID level 60 to a RAID level 50.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method for a redundant array of independent disks (RAID) controller for migrating a RAID level in spanned arrays, comprising:
   receiving a command for a RAID level migration from a first RAID level in spanned arrays to a second RAID level;
   initializing a number of pointers which correspond to a number of the spanned arrays in the first RAID level, wherein each pointer is associated with one of the spanned arrays, and wherein initializing the number of pointers comprises placing each pointer to a first data block of corresponding one of the spanned arrays in the first RAID level; and
   transferring at least one data block of the first RAID level in the spanned arrays by incrementing and placing each pointer on subsequent data blocks in the corresponding one of the spanned arrays to form the second RAID level.

2. The method of claim 1, wherein the first RAID level comprises a RAID level 10 and the second RAID level comprises a RAID level 00.

3. The method of claim 1, wherein the first RAID level comprises a RAID level 50 and the second RAID level comprises a RAID level 00.

4. The method of claim 1, wherein the first RAID level comprises a RAID level 60 and the second RAID level comprises a RAID level 50.

5. The method of claim 1, wherein the first RAID level comprises a RAID level 60 and the second RAID level comprises a RAID level 00.

6. The method of claim 1, wherein transferring the at least one data block comprises:
   reading the at least one data block for each of the spanned arrays using the number of pointers;
   storing the at least one data block from the spanned arrays to a cache memory of the RAID controller;
   overwriting each of the at least one data block to a respective target data block in the spanned arrays to form the second RAID level; and
   erasing each of the at least one data block from the cache memory of the RAID controller once the overwriting is completed.

7. The method of claim 1, wherein the spanned arrays are directly attached to a host server.

8. The method of claim 1, wherein the RAID controller comprises a battery backup unit.

9. The method of claim 1, wherein the number of pointers are stored in a nonvolatile random access memory (NVRAM) of the RAID controller.

10. The method of claim 7, wherein copies of the number of pointers are stored in a reserved sector of a main memory of the host server.

11. A method for a redundant array of independent disks (RAID) controller for migrating from a RAID level 10 to a RAID level 00, comprising:

receiving a command for a RAID level migration from a RAID level 10 to a RAID level 00;

initializing a number of pointers which correspond to a number of RAID level 1 arrays in the RAID level 10, wherein the number of pointers are stored in a nonvolatile random access memory (NVRAM) of the RAID controller, wherein the number of RAID level 1 arrays comprises a first RAID level 1 array and a second RAID level 1 array, and wherein the number of pointers comprise a first pointer and a second pointer associated with the first RAID level 1 array and the second RAID level 1 array respectively, and wherein initializing the number of pointers comprises placing the first pointer to a first data block of a first disk of the first RAID level 1 array and the second pointer to a first data block of a first disk of the second RAID level 1 array; and transferring respective data blocks of the RAID level 10 by incrementing and placing the first pointer and second pointer on subsequent data blocks of the first RAID level 1 array and the second RAID level 1 array respectively to form the RAID level 00.

12. The method of claim 11, wherein transferring the respective data blocks of the RAID level 10 comprises:

concurrently reading a second data block of the first disk of the first RAID level 1 array and a second data block of the first disk of the second RAID level 1 array using the first pointer and the second pointer, respectively;

storing the second data block of the first disk of the first RAID level 1 array and the second data block of the first disk of the second RAID level 1 array to a cache memory of the RAID controller; and overwriting a first data block of a second disk of the first RAID level 1 array with the second data block of the first disk of the first RAID level 1 array and a first data block of a second disk of the second RAID level 1 array with the second data block of the first disk of the second RAID level 1 array.

13. The method of claim 12, further comprising forwarding respective acknowledgement signals upon a completion of the overwriting the first data block of the second disk of the first RAID level 1 array and the first data block of the second disk of the second RAID level 1 array.

14. The method of claim 13, further comprising erasing the second data block of the first disk of the first RAID level 1 array and the second data block of the first disk of the second RAID level 1 array from the cache memory of the RAID controller.

15. A method for a redundant array of independent disks (RAID) controller for migrating from a RAID level 50 to a RAID level 00, comprising:

receiving a command for a RAID level migration from a RAID level 50 to a RAID level 00;

initializing a number of pointers which correspond to a number of RAID level 5 arrays in the RAID level 50, wherein the number of pointers are stored in a nonvolatile random access memory (NVRAM) of the RAID controller, wherein the number of RAID level 5 arrays comprises a first RAID level 5 array and a second RAID level 5 array, and wherein the number of pointers comprise a first pointer and a second pointer associated with the first RAID level 5 array and the second RAID level 5 array respectively, and wherein initializing the number of pointers comprises placing the first pointer to a first data block of a first disk of the first RAID level 5 array and the second pointer to a first data block of a first disk of the second RAID level 5 array; and transferring respective data blocks of the RAID level 50 by incrementing and placing the first pointer and second pointer on subsequent data blocks of the first RAID level 5 array and the second RAID level 5 array respectively to form the RAID level 00.

16. The method of claim 15, wherein transferring the respective data blocks of the RAID level 50 comprises:

concurrently reading a second data block of the first disk of the first RAID level 5 array and a second data block of the first disk of the second RAID level 5 using the first pointer and the second pointer, respectively;

storing the second data block of the first disk of the first RAID level 5 array and the second data block of the first disk of the second RAID level 5 array to a cache memory of the RAID controller; and overwriting a first data block of a third disk of the first RAID level 5 array with the second data block of the first disk of the first RAID level 5 array and a first data block of a third disk of the second RAID level 5 array with the second data block of the first disk of the second RAID level 5 array.

17. The method of claim 14, further comprising repeating the steps of concurrently reading, storing, overwriting, forwarding respective acknowledgement signals, and erasing for remaining data blocks of the first RAID level 1 array and the second RAID level 1 array by incrementing and placing the first pointer and second pointer on the subsequent data blocks of the first RAID level 1 array and the second RAID level 1 array respectively.

18. The method of claim 16, further comprising erasing the second data block of the first disk of the first RAID level 5 array and the second data block of the first disk of the second RAID level 5 array from the cache memory of the RAID controller upon a completion of the overwriting the first data block of the third disk of the first RAID level 5 array and the first data block of the third disk of the second RAID level 5 array.

19. The method of claim 18, further comprising repeating the steps of concurrently reading, storing, overwriting, and erasing for remaining data blocks of the first RAID level 5 array and the second RAID level 5 array by incrementing and placing the first pointer and second pointer on the subsequent data blocks of the first RAID level 5 array and the second RAID level 5 array respectively.

* * * * *